United States Patent [19]
Sandorf

[11] 3,803,385
[45] Apr. 9, 1974

[54] TEMPERATURE CONTROL CIRCUIT FOR MOLTEN MATERIAL DISPENSING SYSTEM

[75] Inventor: Robert E. Sandorf, Richfield, Ohio

[73] Assignee: Nordson Corporation, Amherst, Ohio

[22] Filed: June 1, 1972

[21] Appl. No.: 258,584

[52] U.S. Cl.................. 219/499, 219/483, 219/497
[51] Int. Cl. .............................................. H05b 1/02
[58] Field of Search .......... 219/477, 480, 483, 497, 219/499, 421

[56] References Cited
UNITED STATES PATENTS

| | | | |
|---|---|---|---|
| 3,585,361 | 6/1971 | Rosen et al. | 219/421 |
| 3,431,399 | 3/1969 | Venning | 219/497 |
| 3,560,712 | 2/1971 | Toohill | 219/497 |

*Primary Examiner*—Bernard A. Gilheany
*Assistant Examiner*—F. E. Bell
*Attorney, Agent, or Firm*—Wood, Herron & Evans

[57] ABSTRACT

A circuit for controlling the temperature of molten material in a plurality of separate containers, for example, separate hoses independently connecting molten adhesive dispensing guns to a supply tank, including a plurality of electrical heaters each respectively associated with a different heated container; an electrical power supply common to all the heaters which, when activated, simultaneously energizes all heaters; an electronic switch interconnected between the heaters and the power supply for controlling application of electrical power to the heaters; and thermostatic control means including a plurality of thermistors each responsive to the temperature of a different one of the heated containers, a bridge network having a reference temperature leg connected to a first sample point and a plurality of parallel legs each including a different one of the thermistors connected in common to a second sampling point, and a differential amplifier responsive to the sample points which provides an output for controlling the switch to terminate application of power to the heaters when any one of the heated containers reaches the desired reference temperature.

5 Claims, 1 Drawing Figure

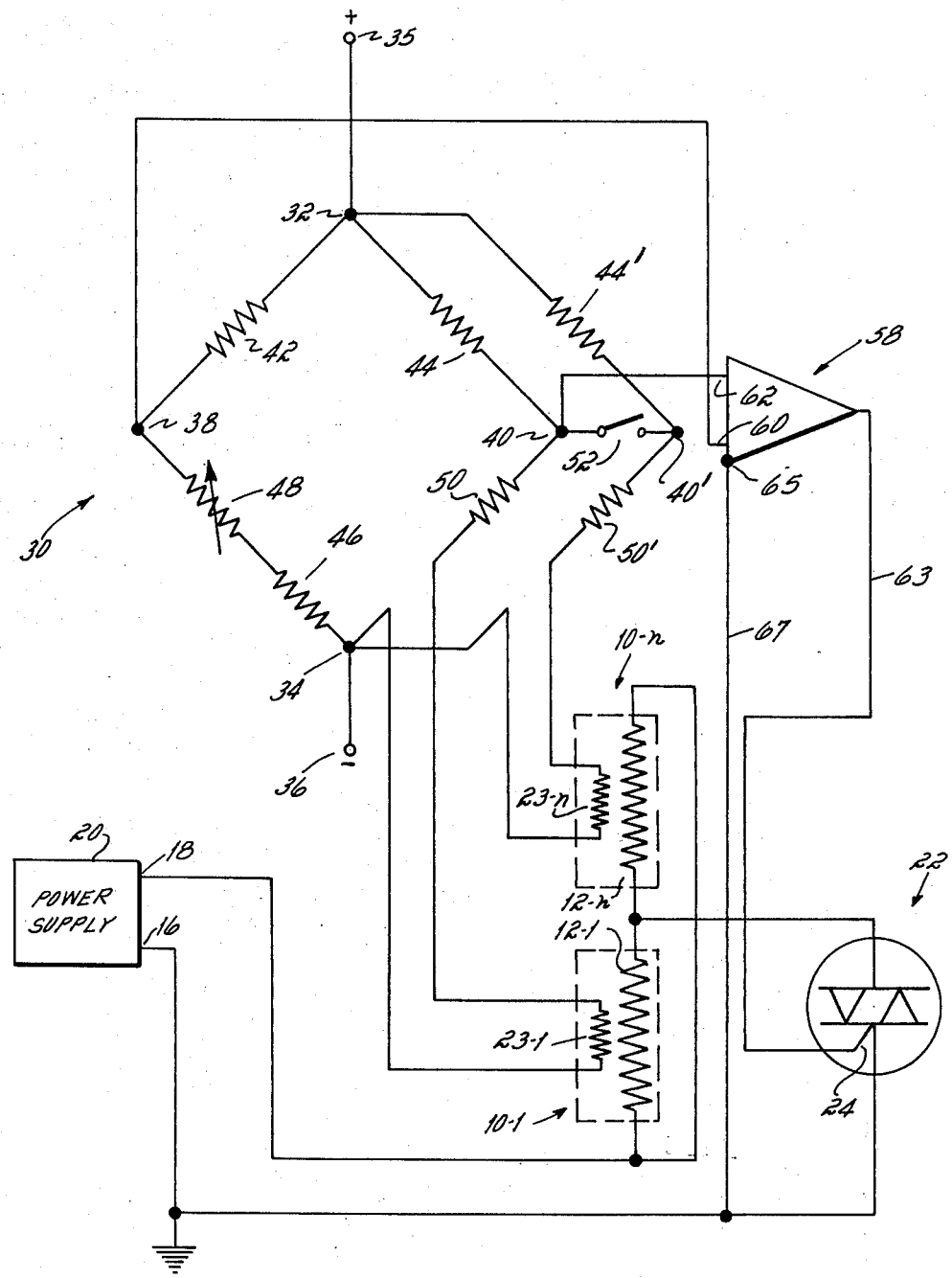

TEMPERATURE CONTROL CIRCUIT FOR MOLTEN MATERIAL DISPENSING SYSTEM

This invention relates to the dispensing of heated material from a plurality of heated containers, and more particularly to an improved control circuit for regulating the temperature of the dispensed material.

In recent years, systems for dispensing molten adhesive from applicators in the form of handguns, extruders, or the like have come into widespread use. Illustrative of such systems is the system disclosed in U. S. Pat. No. 3,585,361. Typically, molten adhesive dispensing systems include a pressurized storage tank provided with a heater for supplying a molten adhesive under pressure to a plurality of applicators via individual hoses connecting the respective applicators to a manifold associated with the tank. Since the molten material has an opportunity to cool in the course of travel through the hose, degrading the dispensed adhesive, it is desirable that the hoses be heated.

Accordingly, each hose is usually provided with a heater in the form of a resistance heating coil or the like, and a temperature-sensing element which reflects the temperature of the molten material in the hose for thermostatically controlling energization of the hose heater. Heretofore it has been the practice to individually control the energization of each hose heater in response to the output provided by its respective temperature-sensing element. For example, in the system of U. S. Pat. No. 3,585,361 the temperature-sensing element of each hose, which in that patent takes the form of an expansion-type bulb sensor, controls a separate switch, which switch in turn regulates the application of electrical power to the hose heater controlled by that switch. Thus, in such previously proposed thermostatic control schemes there are as many thermostatic heater control subsystems as there are heated hoses. Unfortunately, this duplication of heater controls has unnecessarily increased the cost and complexity of the system.

Accordingly, it has been an objective of this invention to provide, in a molten adhesive applicator system of the multiple-hose type, thermostatically controlled heating means for the hoses which is less complex, and hence lower in cost, than the hose heating schemes heretofore proposed. This objective has been accomplished in accordance with certain principles of this invention by energizing the hose heaters from a power source through a common signal-actuated switch means controlled by the output of a single comparator, for example, a differential amplifier, which differential amplifier in turn responds to a single electrical bridge network in which temperature-sensing elements, such as thermistors, associated with each heated hose, are connected in parallel in one leg thereof. The approach of this invention has the cost-reducing advantage of requiring, for a plurality of heated hoses, only one bridge network, differential amplifier comparator and power source switch means. Yet, it has been found that there is no appreciable loss in accuracy or ability to regulate the temperatures in a plurality of hoses.

Another and equally significant advantage of this invention, particularly by virtue of the parallel connection of the temperature-sensing elements in the bridge network, is the ability to conveniently and quickly increase or reduce the number of hoses under thermostatic control by the system. Such is accomplished by actuating a manual switch which connects or disconnects in the bridge network, as the case may be, the parallel connected temperature-sensing element associated with the hose which is being added to, or removed from, control by the system. Additionally, no re-balancing of the bridge is necessary when a hose is added or removed from thermostatic control by the system.

A further advantage of this invention, and also attributable to parallel connection in the bridge of the temperature-sensing elements associated with the different hoses, is the capability of the system to avoid uncontrolled heating of molten material, and consequent damage to the hose, should a temperature-sensing element become defective, such as by open-circuiting. In this invention, should a temperature-sensing element become open-circuited, the bridge network will signal the differential amplifier comparator to supply more heat to the hoses than would otherwise occur. However, heater energization, and hence hose temperature, is maintained within safe limits, albeit at a higher value than the system was initially programmed to provide.

These and other advantages and features of the invention will become more readily apparent from a detailed description thereof taken in conjunction with the drawings in which the single FIGURE is a schematic circuit diagram showing the inter-relationship of the heated containers, single power supply and associated electronic switch, bridge circuit with container thermistors connected in parallel in one leg, and differential amplifier for controlling the application of power to the heaters to maintain the desired material temperature.

With reference to the FIGURE a plurality of heated containers or hoses 10–1, ... 10–n are shown. In a preferred form the heated containers 10–1, ... 10–n take the form of thermally insulated hoses or conduits which transport molten thermoplastic adhesive from the output manifold of a large pressurized tank (not shown) to individual adhesive applicators such as extruders, hand-guns, or the like (not shown). Associated with each hose 10–1, ... 10–n is an electric heater 12–1, ... 12–n such as resistive tape helically wound about the hose. A typical hose with associated heater is disclosed in U. S. Pat. No. 3,585,361, issued June 15, 1971, assigned to the assignee of this application. The disclosure of U. S. Pat. No. 3,585,361 is incorporated herein by reference. The heaters 12–1, ... 12–n are connected in parallel across the grounded and ungrounded terminals 16 and 18, respectively, of an a.c. power supply 20 via a signal-responsive electronic switch 22. The heaters 12–1, ... 12–n are connected between the ungrounded terminal 18 of the power supply 20 and one side of the signal-responsive switch 22, with the other side being connected to the grounded power supply terminal 16.

The electronic switch 22 preferably takes the form of a bidirectional triode thyristor (Triac) having a gate or control electrode 24. The triac 22, which is analogous to two conventional silicon controlled rectifiers connected in inverse parallel, is rendered conductive for one-half cycle (180 electrical degrees), when energized by a.c. power, in response to the application of a control pulse to gate electrode 24 at the beginning of the one-half cycle when the applied a.c. voltage is zero. If successive control pulses on gate 24 are applied at 180 electrical degree intervals corresponding to zero crossings of the applied a.c. voltage, the triac 22 will be rendered conductive for successive one-half cycles, notwithstanding alternating polarity of the applied a.c. voltage during successive one-half cycles. Since the structure, operation and control of signal-responsive electronic switches such as triacs are well known in the art, further discussion of the electronic switch 22 is considered unnecessary.

Associated with each of the heated containers or hoses 10-1, ... 10-n is a temperature-sensing element 23-1, ... 23-n, preferably a thermistor. The electrical properties of a thermistor is such that its resistance decreases as its temperature increases, and vice versa. The thermistors 23-1, ... 23-n are normally embedded in the hoses 10-1, ... 10-n such that their temperature, and hence their resistance, closely reflects the temperature of the molten material contained within the hose.

An electrical bridge 30 having a pair of opposite nodes 32 and 34 connected between the positive and negative terminals 35 and 36 of a d.c. power supply (not shown) is provided. The bridge 30 includes a pair of sampling nodes 38 and 40. Identical resistors 42 and 44 are connected in the leg between nodes 32 and 38 and the leg between nodes 32 and 40. A variable resistance leg, including a fixed resistor 46 and a variable resistor 48 connected in series, is connected between nodes 38 and 34 and functions to establish a reference resistance value correlated to the temperature at which it is desired to maintain the material in the containers 10-1, ... 10-n. The thermistor 23-1 along with a fixed resistor 50 is connected in series in the bridge leg between nodes 34 and 40. If the temperature of the material in hose 10-1, as reflected by the resistance of the thermistor 23-1, is equal to the desired temperature established by the variable resistance bridge leg 46, 48, the sampling nodes 38 and 40 will be at the same voltage. If the temperature of the heated material in hose 10-1 is above or below the reference temperature established by variable resistance leg 46, 48, the voltage at sample node 40 will be below or above, respectively, the voltage of sample node 38.

Bridge resistance legs 44 and 23-1,50 between nodes 32-40 and 34-40, respectively, are duplicated as many times as there are heated containers 10-1, ... 10-n. Thus, if there are n heated containers 10-1, ... 10-n, there would be n sets of identical resistance bridge legs between nodes 32-40 and 34-40. Since two heated hoses 10-1 and 10-n are shown in the FIGURE. a second pair of bridge legs is provided in the bridge 30, namely, between nodes 32-40' and 34-40'. Connected in the leg between nodes 32 and 40' is a resistor 44' identical to resistor 44. Connected in the leg between nodes 34 and 40' is a series combination of a fixed reisstor 50' and the thermistor 23-n associated with the heated hose 10-n. Assuming the thermistors 23-1 and 23-n exhibit identical resistances at identical temperatures, the resistors 50 and 50' would be identical. A selectively operable manually actuated switch 52 is provided between nodes 40 and 40'. Switch 52 is closed when it is desired to control the temperature of molten material in both heated hoses 10-1 and 10-n, while the switch is placed in its open-circuit condition when it is desired to control the temperature of the molten material in only the hose 10-1. For a given number, n, of heated hoses, there will be n-1 switches 52.

Assuming it is desired to control the temperature of the molten material in both hoses 10-1 and 10-n, and that switch 52 is therefore closed, and further ignoring the effects of the resistance of leg 34-40 on the voltage of node 40', the voltage at node 40' will be equal to the voltage of node 38 when the temperature of the molten material in hose 10-n as reflected by the resistance of the thermistor 23-n is equal to the desired reference temperature set by variable resistance reference leg 34-38. The voltage of mode 40' will be above and below the voltage of node 38 when the temperature of the molten material in hose 10-n is below and above, respectively, the desired molten material temperature established by reference resistance leg 34-38.

To control the operation of the electronic switch 22 and, hence, the application of electrical power to the resistors 12-1, ... 12-n in response to the bridge 30, a comparator in the form of a combined differential amplifier and triac trigger circuit 58 is provided having input terminals 60 and 62, an output line 63, and Series reference terminal 65 connected to the triac 22 via line 67 to reference the amplifier/trigger output to the voltage applied to the triac by supply 20. Differential amplifier/trigger 58 provides pulses on its output 63 at 180 electrical degree intervals in synchronism with the a.c. power energizing it when the voltage at terminal 62 exceeds the voltage at terminal 60 by a predetermined amount. Such combined differential amplifier/trigger circuits are well known and are described in various publications of RCA Corporation, e.g., RCA Pamphlet 490 - Linear Integrated Circuits, and RCA Solid State Data Book series SSD-202. Input terminal 60 is connected to bridge sample node 38, while input terminal 62 is connected to bridge sample node 40, and to sample node 40' via switch 52. The differential amplifier/trigger 58 provides output pulses to the triac control gate 22 in synchronism with the zero crossings of the a.c. power applied to the triac by source 20 when the temperature of the molten material in all hoses 10-1, ... 10-n is below the desired temperature established by the resistance of bridge leg 46, 48, that is, when the voltage input to terminal 62 from nodes 40 and 40' exceeds the voltage input to terminal 60 from node 38. With trigger pulses applied to the triac 22, the triac conducts and as a closed circuit, with the result that heaters 12-1, ... 12-n are energized by source 20.

When the temperature of the molten material in one or more of the hoses 10-1, ... 10-n is at the desired temperature established by the resistance bridge leg 46, 48, the input to differential amplifier/trigger 58 at terminal 62 reflecting the voltages of nodes 40 and 40' is equal to the input to terminal 60 from node 38. With the inputs to differential amplifier/trigger terminals 60 and 62 equal, the differential amplifier/trigger does not provide pulses to the control gate 24 of the triac 22, with the result that the triac effectively constitutes an open-circuit and the heaters 12-1, ... 12-n are not energized from the source 20.

If the temperature of the molten material of all hoses 10-1, ... 10-n is initially below the desired temperature established by the resistance of bridge leg 46, 48, the differential amplifier/trigger 58 will provide control pulses to the gate 24 of triac 22, causing the latter circuit element to operate as an electrical closed-circuit and energize all heaters 12-1, ... 12-n from the power supply 20. The application of power to all heaters 12-1, ... 12-n via triac 22 will continue until the temperature of the molten material in one of the hoses 10–1, . . . 10–n reaches the desired level. At this point the node 40, 40' of the bridge leg 34, 40, . . . 34, 40' containing the thermistor 23–1, . . . 23–n associated with the hose having the material which has reached the desired temperature reaches a value equal to the voltage of node 38, whereupon the differential input to terminals 60 and 62 terminates. This in turn causes the triac-operating pulses on line 63 output from the differential amplifier-trigger to cease. The triac 22 then returns to its nonconducting, open-circuit condition and the energization of all heaters 12–1, . . . 12–n from the power supply 20 ceases.

In the event that one of the thermistor legs 34, 40 or 34, 40' becomes defective, that is, becomes an open-circuit, the combined resistance of legs 34, 40 and 34, 40' increases with the result that the voltage at nodes 40, 40' input to differential amplifier terminal 62 increases. This increase in voltage at terminal 62 is interpreted by the differential amplifier/trigger 58 as a decrease in the temperature of the molten material. This causes the triac 22, with respect to the temperature of the molten material, to be rendered conductive prematurely. The net result is that the molten material in the hoses is heated to a temperature above that desired. However, the increased temperature will not be so substantial as to burn-out the hoses.

Having described the invention, it is claimed:

1. A control circuit for thermostatically regulating the temperature at which molten material is maintained in a plurality of containers each having an electrical heater supplied with electrical power from a common electrical power supply, comprising:

a plurality of temperature-sensing elements having an electrical resistance which varies with variations in temperature, each of said elements being associated with a different one of said containers to provide a resistance correlated to the temperature of the molten material in its respective container, said sensing elements being connected in parallel, a signal-actuated electrical switch operable between an open circuit and closed circuit condition in response to a signal, said switch interconnected between said power supply and all of said heaters for simultaneously controlling the application of power to all said heaters in common when said switch is actuated by said signal, a single bridge network having a single reference leg connected to a first sample node to provide a reference voltage at said first node correlated to a single temperature at which it is desired to maintain the molten material in all said containers, said bridge containing a second leg including said parallel connected sensing elements connected to a second sample node for providing a voltage correlated to the temperatures sensed by said elements, and a comparator responsive to said first and second nodes and providing a signal correlated to the relationship between the voltages of said first and second nodes, said signal being input to said switch for actuating it to control in common the supply of electrical power to all said heaters.

2. The control circuit of claim 1 wherein said bridge has a third leg including a plurality of resistors corresponding in number to the number of said elements in said second leg, said resistors being connected in parallel and to said second node, and switch means for disconnecting at least one of said resistors and one of said elements from said second node, to render the voltage of said second node independent of the resistance of said one resistor and one element.

3. A control circuit for thermostatically regulating the temperature at which molten material is maintained in a plurality of containers each having an electrical heater supplied with electrical power from a common a.c. electrical power supply, comprising:

a plurality of thermistors each in temperature-sensing relationship with a different container, said thermistors being connected in parallel, a bidirectionally conductive electronic switch operable between a closed and an open circuit in response to a first and second control signal, respectively, said switch interconnected between said power supply and all of said heaters for simultaneously controlling the application of power to all said heaters in common when said switch is actuated by said control signal, a single bridge network having a single selectively variable reference leg connected to a first sample node to provide a selectively variable reference voltage at said first node correlated to a single selectively variable temperature at which it is desired to maintain the molten material in all said containers, said bridge containing a second leg including said parallel connected thermistors connected to a second sample node for providing a voltage correlated to the temperatures sensed by said thermistors, and a differential amplifier responsive to said first and second nodes for providing said first control signal input to said switch when all of said thermistors reflect temperatures below said single temperature for placing said switch in its closed circuit condition to power all said heaters, said differential amplifier providing said second control signal to said switch when at least one of said thermistors reflects a temperature at least equal to said single temperature for placing said switch in its open circuit condition to simultaneously terminate power to all said heaters.

4. A system for heating molten material comprising:

a plurality of containers for containing molten material to be heated, an electric heater means positioned in heat transfer relation to said containers, an electric current source, an electronic switch having a control electrode for receiving signals to change said switch between conductive and nonconductive conditions, said heater means and said switch being connected in series across said current source, a comparator having a first and second input and having an output connected to said control electrode, said comparator being operative to generate a signal at its output when a predetermined relationship between signals at its input exists, said switch being rendered conductive to energize said heater means in response to said signal at the output of said comparator;

a plurality of temperature-sensing elements having temperature-dependent resistances, each positioned in temperature-sensing relationship with a different one of said containers, a voltage source, an impedance bridge having opposite input leads connected across said voltage source, said bridge having a plurality of impedance legs connected in parallel across said leads, said plurality including:

a. a reference leg having a pair of series connected resistive branches, the juncture of which is connected to one of said comparator inputs; and
b. a plurality of variable legs each having a pair of series connected resistive branches, one of which includes one of said elements, and means for connecting the junctures of the branches of at least one of the variable legs to the other of said comparator inputs, said comparator providing a signal to said switch control electrode to energize all said heaters in common when the voltage at said junctures bear said predetermined relationship.

5. A control circuit for thermostatically regulating the temperature at which molten material is maintained in a plurality of containers each having electrical heating means supplied with electrical power from a common electrical power supply, comprising:

a plurality of temperature-sensing elements having an electrical characteristic which varies with variations in temperature, each of said elements being associated with a different one of said containers to facilitate production of a variable electrical signal correlated to the temperature of the molten material in its respective container, a single signal-actuated electrical switch means operable in an open circuit and closed circuit condition in response to a control signal, said switch interconnected between said power supply and said heating means of all said containers for simultaneously controlling the application of power to said heating means of all said containers when said switch is actuated by said control signal, a reference signal source for providing a reference signal correlated to a single temperature at which it is desired to maintain the molten material in all said containers, and a single comparator responsive to said reference signal and said variable signals for providing an output signal correlated to the relationship between said reference and variable signals, said output signal being input to said switch for actuating it to control simultaneously and in common the supply of electrical power to said heating means of all said containers.

* * * * *